(12) United States Patent
Varonen et al.

(10) Patent No.: US 9,161,163 B2
(45) Date of Patent: *Oct. 13, 2015

(54) METHOD AND SYSTEM FOR LOCATING A MOBILE TERMINAL

(71) Applicant: NOKIA CORPORATION, Espoo (FI)

(72) Inventors: Tomi Varonen, Helsinki (FI); Sebastian Kraufvelin, Tenhola (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/289,532

(22) Filed: May 28, 2014

(65) Prior Publication Data

US 2014/0274167 A1     Sep. 18, 2014

Related U.S. Application Data

(63) Continuation of application No. 10/456,517, filed on Jun. 9, 2003, now Pat. No. 8,755,822, which is a continuation-in-part of application No. 10/384,628, filed on Mar. 11, 2003, now abandoned.

(60) Provisional application No. 60/439,442, filed on Jan. 13, 2003.

(51) Int. Cl.
*H04W 24/00* (2009.01)
*H04W 4/02* (2009.01)
(Continued)

(52) U.S. Cl.
CPC ............... *H04W 4/02* (2013.01); *H04L 67/18* (2013.01); *H04W 8/10* (2013.01); *H04L 65/1016* (2013.01); *H04W 88/18* (2013.01); *H04W 92/02* (2013.01)

(58) Field of Classification Search
USPC ...................................................... 455/456.2
See application file for complete search history.

(56) References Cited

U.S. PATENT DOCUMENTS 5,862,481 A    1/1999   Kulkarni et al.
6,219,557 B1   4/2001   Havinis
(Continued)

FOREIGN PATENT DOCUMENTS

WO    0172007 A1    9/2001
WO    02054811 A1   7/2002
WO    03065750 A1   8/2003

OTHER PUBLICATIONS

3rd Generation Partnership Project, "Technical Specification Group Services and System Aspects", Functional, stage 2 description of LCS (Release 6), 3GPP TS 23.271 V6.2.0, Dec. 2002, pp. 1-91.

(Continued)

*Primary Examiner* — Mazda Sabouri
(74) *Attorney, Agent, or Firm* — Ditthavong & Steiner, P.C.

(57) ABSTRACT

A method and system locates a mobile terminal addressed in a location service request using an overlay identity. According to one aspect of the invention a location service client accesses a first subscriber database, thereby providing said overlay identity, in order to derive a cellular identity of said mobile terminal. According to another aspect of the invention the location service client accesses a location service server in order thereby providing said overlay identity. The location service server initiates a privacy check using said overlay identity and in response receives a cellular identity. The cellular identity then may be used to request a location service to enhance functionality.

16 Claims, 5 Drawing Sheets

(51) Int. Cl.
  *H04L 29/08* (2006.01)
  *H04W 8/10* (2009.01)
  H04L 29/06 (2006.01)
  H04W 88/18 (2009.01)
  H04W 92/02 (2009.01)

(56) References Cited

U.S. PATENT DOCUMENTS

| | | |
|---|---|---|
| 6,469,998 B1 | 10/2002 | Salinas et al. |
| 6,662,014 B1 | 12/2003 | Walsh |
| 6,735,441 B1 | 5/2004 | Turgeon et al. |
| 7,177,321 B2 | 2/2007 | Bae |
| 2001/0055394 A1 | 12/2001 | Vanttinen et al. |
| 2002/0072352 A1 | 6/2002 | Jana et al. |
| 2002/0080968 A1 | 6/2002 | Olsson |
| 2002/0086682 A1 | 7/2002 | Naghian |
| 2002/0147845 A1 | 10/2002 | Sanchez-Herrero et al. |
| 2003/0027569 A1 | 2/2003 | Ejzak |
| 2003/0078053 A1 | 4/2003 | Abtin et al. |
| 2003/0115260 A1 | 6/2003 | Edge |
| 2003/0225515 A1 | 12/2003 | Havlark et al. |
| 2004/0193700 A1 | 9/2004 | Westman et al. |
| 2004/0203849 A1* | 10/2004 | Allison et al. ............. 455/456.1 |
| 2004/0203900 A1 | 10/2004 | Cedervall et al. |
| 2005/0014485 A1 | 1/2005 | Kokkonen et al. |
| 2005/0014500 A1 | 1/2005 | Muhonen et al. |
| 2005/0020259 A1 | 1/2005 | Herrero |
| 2005/0117602 A1 | 6/2005 | Carrigan et al. |
| 2005/0152363 A1 | 7/2005 | Malik et al. |
| 2006/0099958 A1* | 5/2006 | Gustafsson et al. ....... 455/456.1 |

OTHER PUBLICATIONS

European Office Action for related European Application No. 03778638.1-1249, dated Dec. 2, 2010, pp. 1-7.

\* cited by examiner

METHOD AND SYSTEM FOR LOCATING A MOBILE TERMINAL

CROSS-REFERENCE TO RELATED APPLICATIONS

This application is a continuation of U.S. application Ser. No. 10/456,517, entitled "METHOD AND SYSTEM FOR LOCATING A MOBILE TERMINAL", by T. Varonen, et al., filed Jun. 9, 2013, which is a Continuation In Part of application Ser. No. 10/384,628, entitled "METHOD AND SYSTEM FOR LOCATING A MOBILE TERMINAL", by T. Varonen, et al., filed Mar. 11, 2003, which claims the benefit of priority of Provisional Application No. 60/439,442, entitled "METHOD AND SYSTEM FOR LOCATING A MOBILE TERMINAL", by T. Varonen, et al., filed Jan. 13, 2003, the contents of each being incorporated herein by reference.

FIELD OF THE INVENTION

The present invention relates to a method and system for locating a mobile terminal in a cellular network based on a request received from an overlay system, such as a IP (Internet Protocol) Multimedia Subsystem (IMS).

BACKGROUND

In general, overlay systems may be provided in cellular or fixed networks for enabling network operators to offer specific services based on and built upon applications, services and protocols not supported in their networks. The intention is that such services will be developed by the network operators and other third party suppliers using the mechanisms provided by external networks, such as the Internet or other external network systems or subsystems.

Recently, an IP Multimedia core network Subsystem (IMS) has been developed which comprises all core network elements for provision of multimedia services. This includes a collection of signalling and bearer related network elements as defined e.g. in the Third Generation Partnership Project (3GPP) specification TS 23.002. IP Multimedia services are based on an IETF (Internet Engineering Task Force) defined session control capability which, along with multimedia bearers, utilizes the PS (Packet Switched) domain of the cellular network. In order to achieve access independence and to maintain a smooth operation with wireless terminals across the Internet, the IMS attempts to be conformant to IETF "Internet Standards". Therefore, the interfaces specified conform as far as possible to these standards for the case where an IETF protocol has been selected, e.g. SIP (Session Initiation Protocol). The IMS enables the convergence of, and access to, voice, video, messaging, data and to web-based technologies for the wireless user, and combines the growth of the Internet with the growth in mobile communications.

As already mentioned, the IMS utilizes the PS domain to transport multimedia signalling and bearer traffic. The PS domain maintains the service while the mobile terminal moves and hides these moves from the IMS. The IMS is independent of the CS (Circuit Switch) domain although some network elements may be common with the CS domain. This means that it is not necessary to deploy a CS domain in order to support an IMS based network. A mobile station (MS) consists of a mobile or user equipment (ME or UE) with a valid SIM (Subscriber Identity Module) or USIM (Universal Mobile Telecommunications System Subscriber Identity Module) attached. The abbreviation "UE" in this specification refers both to MS and user equipment, even those used for emergency calls, which do not have a valid SIM or USIM.

A UE accessing an IMS service requires an IP address which is logically part of IMS IP addressing domain. There are various identities which may be associated with a user of IP multimedia services. Every IMS subscriber has one or more public user identities. The public user identity is used by any user for requesting communications to other users. For example, this might be included on a business card. Both telecom numbering and Internet naming schemes can be used to address users depending on the public user identities allocated to the users. The public user identity may take the form of a SIP URL (Uniform Resource Locator) as defined in RFC 2543 and RFC 2396, or an E.164 number. At least one public user identity is securely stored on the USIM and may be used to identify the user's information within a subscriber database, e.g. the Home Subscriber Server (HSS), e.g. during mobile terminated set-up.

A location service (LCS) feature in UMTS and GSM (Global System for Mobile Communications) provides a mechanism to support mobile location services for operators, subscribers and third party service providers. Location services may be considered as a network provided enabling technology consisting of standardized service capabilities which enable the provision of location applications. The applications may be service provider specific. In general, LCS is a service concept in a system standardization. LCS specifies all necessary network elements and entities, their functionalities, interfaces as well as communication messages to implement the positioning functionality in a cellular network. Positioning is a functionality which detects a geographical location of e.g. a mobile terminal. Principles and/or algorithms on which the estimation of the geographical location is based may be e.g. AOA, TOA or TDOA. For example, the Global Positioning System (GPS) is based on TOA while OTDOA and E-OTD (on GSM) are based on TDOA.

The positioning of the UE is a service provided by the access network. In particular, all access networks (e.g. UMTS Terrestrial Radio Access Network (UTRAN), GM/EDGE (Enhanced Datarate for GSM Evolution) Radio Access Network (GERAN), which facilitate determination of the locations of UEs, shall be able to exchange location information with a core network as defined in the 3GPP specification TS23.271, when connected to a core network.

By making use of the radio signals, the capability to determine the (geographic) location of the UE can be provided. The location information may be requested by and reported to a client (application) associated UE or by a client within or attached to the core network. The location information may also be utilized internally in a system, for example, for location assisted handover or to support other features, such as home location billing. The position information may be reported in standard, e.g. geographical coordinates, together with the time-of-day and the estimated errors (uncertainty) of the location of the UE according to the 3GPP specification TS 23.032. There are many different possible uses for the location information. As already mentioned, the positioning feature may be used internally by the GSM/UMTS network (or attached networks), by value-added network services, by the UE itself or through the network and by the third parties' services. The positioning feature may also be used by an emergency service. Although LCS has been defined for the CS and PS domains of cellular networks, it has not yet been defined for the IMS domain. Currently, the LCS service does not support IMS LCS clients to be addressed by IMS identities.

BRIEF SUMMARY

It is therefore an object of the present invention to provide a method and system for locating a mobile terminal addressed by an overlay identity used in an overlay system, e.g. an IMS identity used in the IMS.

According to a first aspect of a preferred embodiment of the invention this object is achieved by a method of locating a mobile terminal in a cellular network, said method comprising a) a location service client (80) accessing a first subscriber database, thereby providing an overlay identity, b) said first subscriber database in response returning a cellular identity of said mobile terminal (10), c) said location service client (80) using said cellular identity to request a location service from a location service server d) said location service server using said cellular identity to access the first or a second subscriber database e) said first or second subscriber database in response returning a routing information of said mobile terminal (10), and f) said location service server initiating a location service of said cellular network based on said cellular identity and on said derived routing information.

According to a second aspect which constitutes a further development of the first aspect of a preferred embodiment of the invention, the location service client is an IMS server and the overlay identity is an IMS identity.

According to a third aspect which constitutes a further development of the first or second aspect of a preferred embodiment of the invention, the first subscriber database is a Home Subscriber Server.

According to a fourth aspect which constitutes a further development of the second or third aspect of a preferred embodiment of the invention, said IMS server is a SIP application server and said IMS identity is a SIP URL.

According to a fifth aspect which constitutes a further development of the fourth aspect of a preferred embodiment of the invention, in step a) said SIP application server accesses said Home Subscriber Server utilizing a Sh interface.

According to a sixth aspect which constitutes a further development of anyone of the first to fifth aspects of a preferred embodiment of the invention, said location service server is a Gateway Mobile Location Center.

According to a seventh aspect which constitutes a further development of anyone of the first to sixth aspects of a preferred embodiment of the invention, said step f) is performed by using a MAP-SEND-ROUTING-INFO-FOR-LCS service function.

According to an eighth aspect which constitutes a further development of anyone of the first to seventh aspects of a preferred embodiment of the invention, said cellular identity is an MSISDN or IMSI.

According to a ninth aspect which constitutes a further development of anyone of the first to eighth aspects of a preferred embodiment of the invention, said routing information is an address of a network element, having a switching function in said cellular network.

Additionally, according to tenth aspect of a preferred embodiment of the invention the above object is achieved by a system for locating a mobile terminal in a cellular network, said system comprising: a location service client having an overlay identity of said mobile terminal, a first subscriber database storing a cellular identity of said mobile terminal, which first subscriber database is arranged to be accessible by said location service client and to derive a cellular identity of said mobile terminal based on the overlay identity provided by said location service client, a location service server arranged to receive a location request of said location service client including said cellular identity of said mobile terminal, which location service server is arranged to use said cellular identity for an access to the first subscriber database or a second subscriber database in order to derive a routing information, and to initiate a location service of said cellular network based on said routing information and said cellular identity.

According to a eleventh aspect which constitutes a further development the tenth aspect of a preferred embodiment of the invention, the first subscriber database is a Home Subscriber Server.

According to a twelfth aspect which constitutes a further development of the tenth or eleventh aspect of a preferred embodiment of the invention, the location service client is part of an IMS and said overlay identity is an IMS identity.

According to a thirteenth aspect which constitutes a further development of the twelfth aspect of a preferred embodiment of the invention, said location service client is a SIP application server and said IMS identity is a SIP URL.

According to a fourteenth aspect which constitutes a further development of the thirteenth aspect of a preferred embodiment of the invention, said first subscriber database comprises a HLR multimedia functionality part and an IP multimedia functionality part.

According to a fifteenth aspect which constitutes a further development of the fourteenth aspect of a preferred embodiment of the invention, said cellular identity is stored in the IP multimedia functionality part of said first subscriber database.

According to a sixteenth aspect which constitutes a further development of the fourteenth aspect of a preferred embodiment of the invention, an internal interface is arranged within said first subscriber database for utilizing pointers between both functionality parts.

According to a seventeenth aspect which constitutes a further development of the fourteenth aspect of a preferred embodiment of the invention, said location service server is a Gateway Mobile Location Center (50).

According to an eighteenth aspect which constitutes a further development of anyone of the tenth to seventeenth aspects of a preferred embodiment of the invention, said second subscriber database is a Home Subscriber Server or a Home Location Register of said cellular network.

Additionally, according to a nineteenth aspect of a preferred embodiment of the invention the above object is achieved by a method of locating a mobile terminal in a cellular network, said method comprising: a) a location service client accessing a location service server in order to request a location service thereby providing an overlay identity; b) said location service server sending a conversion request to a Privacy Profile using said overlay identity; c) in response to said conversion request a cellular identity being returned; d) said location service server using said cellular identity to access a subscriber database; e) said subscriber database in response returning a routing information of said mobile terminal; and f) said location service server initiating a location service of said cellular network based on said cellular identity and on said derived routing information.

According to a twentieth aspect which constitutes a further development of the nineteenth aspect of a preferred embodiment of the invention said conversion request is sent in the context of a privacy check; and said cellular identity is returned in response to said privacy check.

According to a twenty first aspect which constitutes a further development of anyone of the nineteenth or twentieth aspects of a preferred embodiment of the invention said location service server contains privacy profile register functionality including a relation between the overlay identity and the cellular identity;

According to a twenty second aspect which constitutes a further development of anyone of the nineteenth or twentieth aspects of a preferred embodiment of the invention said privacy check is performed by accessing a privacy profile register containing a relation between said overlay identity and said cellular identity;

According to a twenty third aspect which constitutes a further development of anyone of the nineteenth to twenty second aspects of a preferred embodiment of the invention said location service client is an IMS server and said overlay identity is an IMS identity.

According to a twenty fourth aspect which constitutes a further development of the twenty third aspect of a preferred embodiment of the invention said IMS server is a SIP application server and said IMS identity is a SIP URL.

According to a twenty fifth aspect which constitutes a further development of anyone of the nineteenth to twenty fourth aspects of a preferred embodiment of the invention said location service server is a Gateway Mobile Location Center.

According to a twenty sixth aspect which constitutes a further development of anyone of the nineteenth to twenty fifth aspects of a preferred embodiment of the invention said step d) is performed by using a MAP-SEND-ROUTING-INFO-FOR-LCS service function.

According to a twenty seventh aspect which constitutes a further development of anyone of the nineteenth to twenty sixth aspects of a preferred embodiment of the invention said cellular identity is an MSISDN or IMSI.

According to a twenty eighth aspect which constitutes a further development of anyone of the nineteenth to twenty seventh aspects of a preferred embodiment of the invention said routing information is an address of a network element, having a switching function in said cellular network.

Additionally, according to a twenty ninth aspect of a preferred embodiment of the invention the above object is achieved by system for locating a mobile terminal in a cellular network, said system comprising a subscriber database, a location service client having an overlay identity of said mobile terminal, and a location service server arranged to receive a location request from said location service client including said overlay identity, said location service server further being arranged to use said overlay identity for sending a conversion request to a Privacy Profile, to receive a cellular identity in response to said conversion request, to use said cellular identity for an access to said subscriber database in order to derive a routing information, and to initiate a location service of said cellular network based on said routing information and said cellular identity.

According to a thirtieth aspect which constitutes a further development of the twenty ninth aspect of a preferred embodiment of the invention said location service server is arranged to send said conversion request in the context of a privacy check; and to receive said cellular identity in response to said privacy check.

According to a thirty first aspect which constitutes a further development of anyone of the twenty ninth or thirtieth aspects of a preferred embodiment of the invention said location service server contains privacy profile register functionality including a relation between the overlay identity and the cellular identity;

According to a thirty second aspect which constitutes a further development of the twenty ninth or thirtieth aspects of a preferred embodiment of the invention said system further comprises a privacy profile register containing a relation between said overlay identity and said cellular identity and being accessible by said location service server;

According to a thirty third aspect which constitutes a further development of anyone of the twenty ninth to thirtieth second aspects of a preferred embodiment of the invention said location service client is part of an IMS and said overlay identity is an IMS identity.

According to a thirty fourth aspect which constitutes a further development of the thirty third aspect of a preferred embodiment of the invention said location service client is a SIP application server and said IMS identity is a SIP URL.

According to a thirty fifth aspect which constitutes a further development of anyone of the twenty ninth to thirty fourth aspects of a preferred embodiment of the invention said location service server is a Gateway Mobile Location Center.

According to a thirty sixth aspect which constitutes a further development of the thirty fifth aspects of a preferred embodiment of the invention said Gateway Mobile Location Center contains domain address information corresponding to the mobile terminal Home Gateway Mobile Location Center.

According to a thirty seventh aspect which constitutes a further development of the thirty fifth aspects of a preferred embodiment of the invention said system further comprises a database containing domain address information, whereby said Gateway Mobile Location Center is further arranged to send a query to said database in order to derive domain address information corresponding to the mobile terminal Home Gateway Mobile Location Center.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENTS

Figure 1:
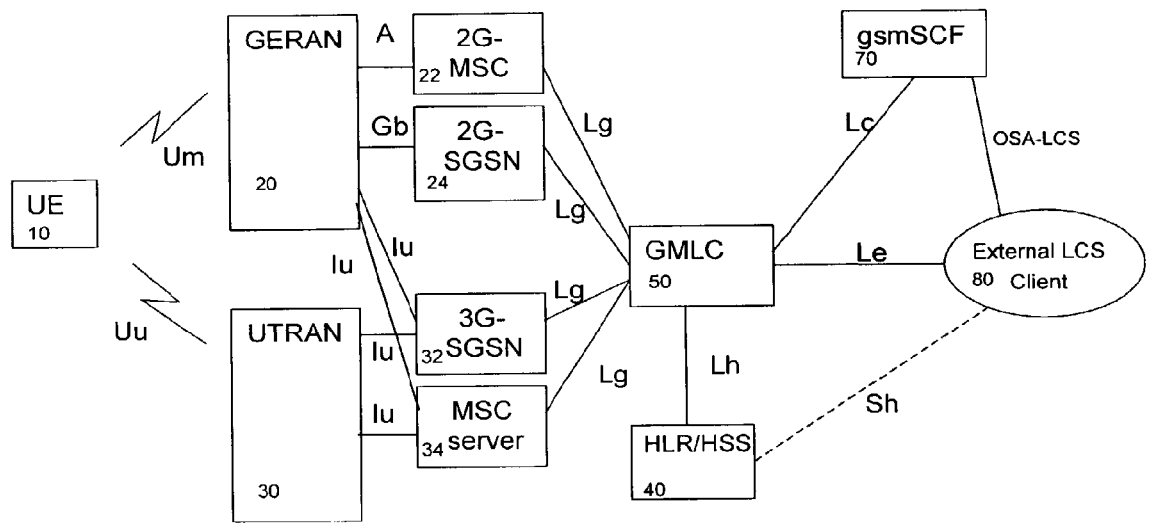
FIG. 1 shows a network architecture for implementing a location service function according to a preferred embodiment of the present invention.

A preferred embodiment will now be described based on an LCS architecture in a UMTS network as shown in FIG. 1. According to FIG. 1, a reference point, called Le Interface, is shown between an LCS server (here: GMLC 50) and an LCS client 80 which, in the present embodiment, is an IMS application server or application. The Le reference point is described in the 3GPP Specification TS 23.271. However, there may be more than a single LCS network interface to several different LCS clients or other networks. These networks may both differ in ownership as well as in communications protocol. The network operator may define and negotiate inter-connection with each external LCS client or other network. In general, an interface differs from a reference point in that an interface is defined where specific LCS information is exchanged and needs to be fully recognized.

Furthermore, an interface called Lg is arranged to connect the LCS server (here GMLC) and a core network (2G-MSC, 2G-/3G-SGSN, MSC server) in order to request location information or, more general, to connect two independent LCS networks, e.g. different PLMNs (Public Land Mobile Networks) for message exchange. The LCS functional entities are grouped into an LCS client functional group and an LCS server functional group. The LCS server functional group consists of functions in the UMTS PLMN supporting LCS, e.g. a client handling component, a system handling component, a subscriber handling component, and a positioning component. The LCS client 80 contains a LCS component with one or more clients, which by using location information can provide location based services. In particular, the LCS client 80 is a logical functional entity that requests from the LCS server in the PLMN location information for one or more than one target UE, i.e. a UE 10 shown in FIG. 1, within a specified set of parameters such as Quality of Service of QoS.

In the present architecture shown in FIG. 1, the LCS client 80 resides in an external entity belonging to an overlay system, i.e. the IMS. Via a location service request, the LCS client 80 communicates with the LCS server, i.e. GMLC 50, to request for the location information of the UE 10. Attributes identified by the location service request may be target UE, LCS identity, state, event, requested QoS information, local coordinate reference system, and/or geographical area. A location service response is sent to the LCS client 80 as the result of the location service request issued by the LCS server. Attributes identified for the location service response may be the location indication of the UE 10 in geographical coordinates, the location of the UE 10 as an ellipsoid with axes and direction of all axes, an estimated achieved QoS, and/or an indication when UE 10 enters or leaves the geographical area.

FIG. 1 illustrates generally the relation of the LCS client 80 and servers in the core network with a GERAN 20 and a UTRAN 30. The LCS entities within the access networks communicate with the core network consisting of a 2G-MSC 22 of the CS domain, a 2G-SGSN 24 of the PS domain, a 3G-SGSN 32 of the PS domain, and an MSC server 34 of the CS domain across A, Gb and Iu interfaces. Communication among the access network LCS entities makes use of the messaging and signaling capabilities of the access network.

Furthermore, a subscriber database, i.e. a HLR/HSS 40 is provided for storing subscriber specific data of the UE 10 and other mobile terminals or equipments. It is noted that the HLR and HSS may be arranged at different locations, while the HLR part may include both 2G-HLR and 3G-HLR functionalities. In this respect it is noted, that the terms "2G" and "3G" denote second and third generation mobile communication functionalities, respectively.

With this configuration both the network and the UE 10 are able to measure the timing of signals and compute a location estimate of the UE 10. Depending on the applied positioning method it is possible to utilize the corresponding configuration containing all needed entities. For instance, if network-based positioning is applied, the entities that are involved in measuring the mobile's signal and calculating its location estimate are allocated to the network elements of the access stratum. On the other hand, in case mobile-based or network-assisted methods are used entities should be allocated to the UE 10.

The GMLC 50 contains functionality required to support LCS. In one PLMN, there may be more than one GMLC. The GMLC 50 is the first node the external LCS client 80 accesses in a GSM PLMN (i.e. the Le reference point is supported by the GMLC 50). The GMLC 50 may request routing information from the HLR/HSS 40 via a Lh interface. After performing registration authorization, it sends positioning requests to either the 2G-MSC 22, SGSNs 24, 32 or MSC server 34 and receives final location estimates from the corresponding entity via the Lg interface. It is noted that several GMLCs may be involved, e.g. a source or requesting GMLC (R-GMLC) accessible directly by the external client, a home GMLC (H-GMLC) of the targeted UE and, where required, a visited GMLC (V-GMLC) connected with the core network the targeted UE presently roams. In this case the information flow between the GMLCs may for example be established via a standardized Lr interfaces, as proposed by 3GPP TS 23.271, see also FIG. 4.

The UE 10 may be involved in various positioning procedures. Specific UE involvement is specified in each of the positioning procedures mentioned in the 3GPP specification TS 25305 for the UTRAN 30 and TS 43.059 for the GERAN 20. The 2G-MSC 22 contains a functionality responsible for UE subscription authorization and managing call related and non-call related positioning requests of LCS. The 2G-MSC 22 is accessible to the GMLC 50 via the Lg interface. The LCS functions of the 2G-MSC 22 are related to charging and billing LCS coordination, location request authorization and operation of the LCS services. If connected to the 2G-SGSN 24 through a Gs interface, it checks whether the UE 10 is GPRS attached to decide whether to page the UE 10 on the A or Gs interface.

The MSC server 34 handles the same functionality as the 2G-MSC 22 including charging and billing, LCS coordination, location requests, authorization and operation of the LCS services. The MSC server 34 is accessible to the GMLC 50 via the Lg interface. Furthermore, the 2G- and 3G-SGSNs 24, 32 contain a functionality responsible for UE subscription authorization and managing positioning requests of LCS. The SGSNs 24, 32 are accessible to the GMLC via the Lg interface. The LCS functions of the SGSNs 24, 32 are related to charging and billing, LCs coordination, location request, authorization and operation of the LCS services. The SGSNs 24, 32 forward the CS paging request received from the Gs interface to a base station subsystem or radio network controller of the respective access network.

The HLR/HSS 40 is accessible from the GMLC 50 via a Lh interface. For a roaming UE, the HLR/HSS 40 may be in a different PLMN.

Furthermore, a gsmSCF (GSM service control function) provides an Lc interface to support access between the LCS and a network functionality CAMEL (Customized Applications for Mobile Network Enhanced Logic) providing the mechanisms of Intelligent Network to a mobile user. The procedures and signaling associated with it are defined in the 3GPP specification TS 23.078 and TS 29.002, respectively.

An important point is the possibility to address and indicate the target UE 10 using a cellular identity, e.g. the MSISDN (Mobile Station Integrated Services Data Network) or IMSI (International Mobile Subscriber Identity), or the like. However, in the present case, the external LCS client 80 belongs to the IMS and thus uses an IMS identity in the location service request supplied to the GLMC 50. Therefore, a mapping function is provided for mapping the IMS identity of the UE 10 with a routing information required for accessing the HLR/HSS 40 allocated to the target UE 10. Thereby, an IP addressing of the target UE 10 can be performed without requiring an active PDP context established between the target UE 10 and the external LCS client 80.

The Lh interface between the GMLC 50 and the HLR/HSS 40 may be based on a Mobile Application Part (MAP) protocol. This interface Lh is used by the GMLC 50 to request a routing information to the serving MSC or SGSN of the particular target UE 10 whose location has been requested. The Lg interface is used by the GMLC 50 to convey the location request to the respective MSC or SGSN function currently serving the target UE 10. Furthermore, the Lg interface is used by the respective MSC or SGSN function to return location results to the GMLC 50.

For the LCS service, a MAP-SEND-ROUTING-INFO-FOR-LCS service is used between the GMLC 50 and the HLR/HSS 40 to retrieve the routing information needed for routing a location service request to the serving MSC or SGSN function.

However, the LCS client has only an overlay or IMS identity of the target UE 10. The LCS client sends a conversion request directly to the HSS (see lower dashed line in FIG. 1) in order to retrieve a target subscriber identity, such as IMSI or MSISDN. The HSS returns the target subscriber identity to the LCS client. If the LCS client is understood as an application server of an IMS then a Sh reference point could be utilized to exchange information between the LCS client and the HSS. For example Sh-pull and Sh-pull resp procedures such as specified in 3GPP TS 29.328 could be utilized to obtain the subscriber identity of the target UE 10 from the HSS. In particular, the subscriber database access may be performed by sending a Sh-pull message containing at least an user identity information element, e.g. a user public identity such as SIP-URL, and a requested data information element, e.g. a PublicIdentifiers XML tag and others, indicating the list of references to the requested information. The requested information in this case at least comprise a List of public identities. In response the HSS sends a Sh-pull resp message which contains said List of public identities of the user in the requested data information element (PublicIdentifiers). Note; that the PublicIdentifiers element according to the present specification 3GPP TS 29.328 contains SIP URL, TEL URL, and MSISDN identities which may be returned to the LCS client. However, the content may be extended to IMSI identity, too. Alternatively a new class under Sh data may be created and corresponding access key may be defined.

Just as well a new interface may be implemented between the LCS client and HSS.

Using the target subscriber identity the LCS client 80 invokes the GMLC 50 via the Le interface in order to accesses the HLR/HSS 40 by a MAP query via the Lh interface, e.g. a MAP-SEND-ROUTING-INFO-FOR-LCS message. Using the cellular identity, the GMLC 50 initiates via the Lg interface a location service function within the cellular network identified by the routing information (address of the serving network element) obtained by the MAP query. Thereby, an IMS LCS service functionality can be provided in the UMTS/GSM network architecture.

Figure 2:
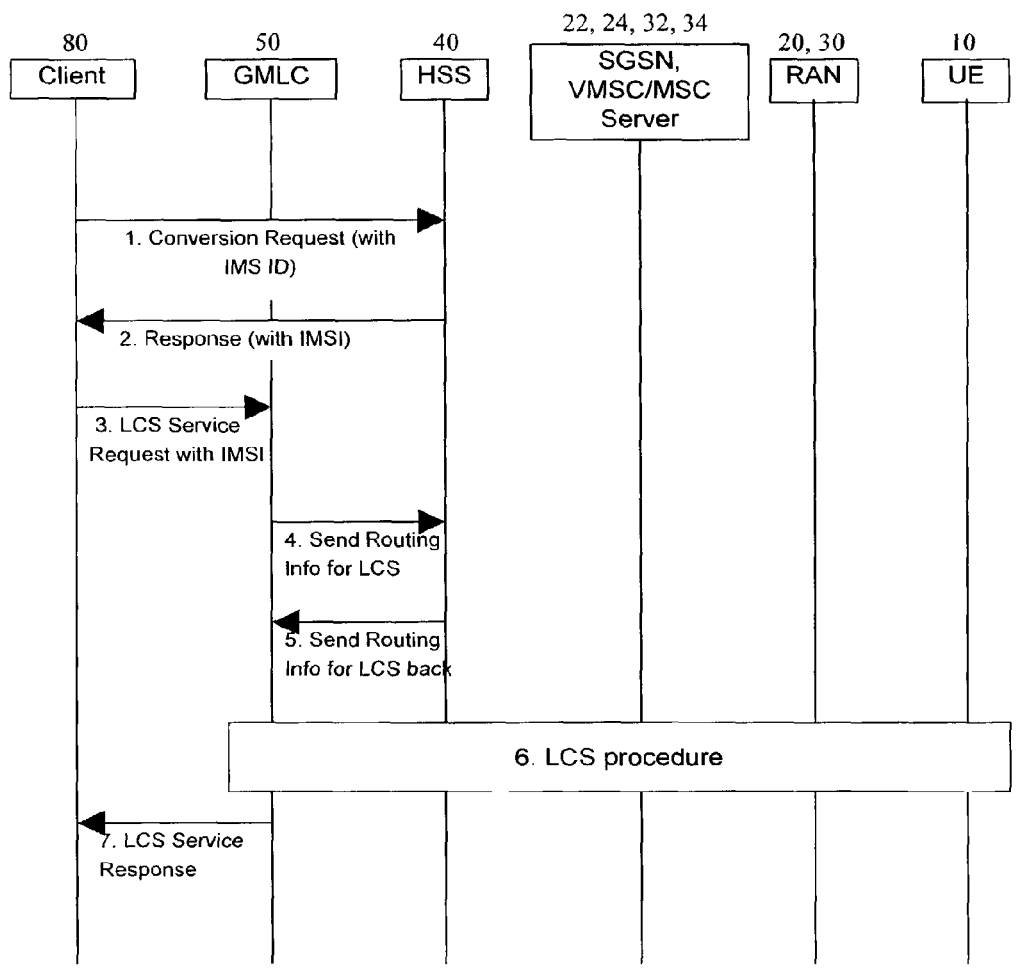
FIG. 2 shows a signaling diagram indicating exchanged signaling messages and procedures in a location service function according to the preferred embodiment of the present invention shown in FIG. 1.

FIG. 2 shows a signaling diagram indicating basic signaling messages and procedures required for the location service function. In particular, in step 1 the external LCS client 80 directly accesses HSS 40 requesting for conversion of the IMS identity to the cellular identity (IMSI or MSISDN). After receiving the subscriber identity (step 2) the LCS client 80, accordingly, may send in step 3 a location service request to the GMLC 50 containing the identity target subscriber information. Then in step 4, a MAP-SEND-ROUTING-INFO-FOR-LCS service may be invoked by the GMLC 50 based on the received subscriber identity in order to retrieve the second routing information from the HLR/HSS 40. After receiving the routing information to the serving network element (step 5) the location service procedure can be invoked by GMLC 50 in the cellular network (step 6). Finally in step 7, the GMLC 50 sends the location service response received from the cellular network to the external LCS client 80.

Figure 3:
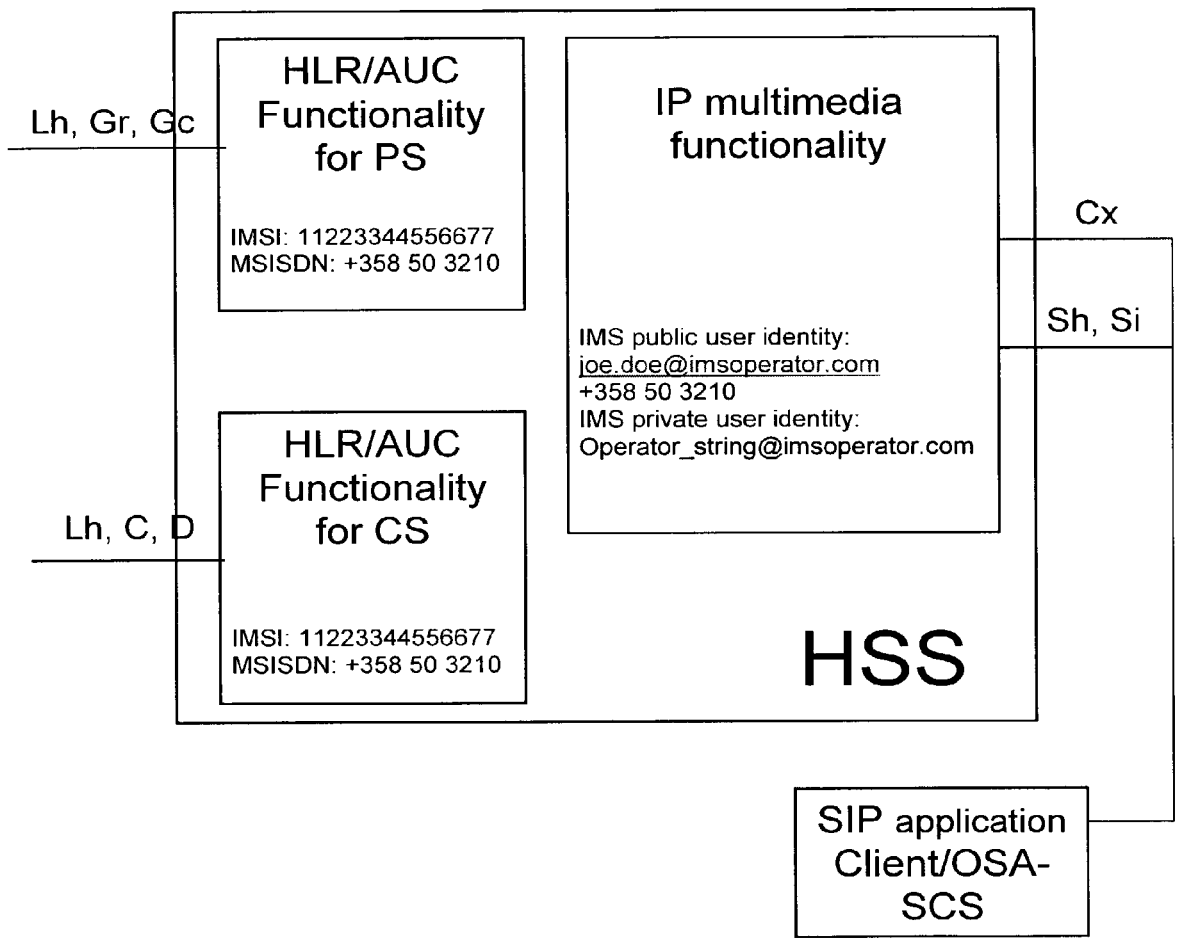
FIG. 3 shows an example of a generic HSS structure and some basis interfaces.

According to an example of a generic HSS logical structure as specified in 3GPP TS 23.002, see FIG. 3, the HSS is the master database for a given user. It is the entity containing the subscription-related information to support the network entities actually handling calls/sessions. The HSS is responsible for holding user related information such as: user identification (cellular identity), numbering and addressing information; user security information (not shown); user location information at internet-system level (not shown); and user profile information (not shown). The HSS may integrate heterogeneous information, and enable enhanced features in the core network to be offered to the application & services domain. According to present standards (3GPP TS 23.002), the HSS consists of IP multimedia functionality to provide support to control functions of IM subsystems such as the CSCF. IP multimedia functionality is needed to enable subscriber usage of the IM CN subsystem services. This IP multimedia functionality is independent of the access network used to access the IM CN subsystem. HSS further consists of the subset of the HLR/AUC functionality required by the PS domain of The subset of HLR/AUC functionality required by the CS domain.

As can be seen from FIG. 3, according to the present standard, the LCS client, if is understood as an application server of an IMS, communicates with the HSS via the Sh reference point. By this means a conversion request may be sent directly to the HSS in order to retrieve a target subscriber identity.

However, there is yet no standardized interface between the above functionalities within the HSS. Therefore, IP multimedia functionality is not aware of identities which belong to HLR and vice versa. Further, when using Cx or Sh interfaces e.g. IMSI can not be retrieved and on the other hand, when using Gc, Gr, C, D, Lh e.g. IMS identities can not be retrieved.

In order to enable the HSS to return target subscriber identities (cellular identity) to the LCS client when IP multimedia functionality is addressed by the provided IMS identity (SIP URL), target subscriber identities either may be stored in the IP multimedia functionality part of HSS, an internal interface is to be arranged utilizing pointers between both functionality parts, or an internal interface between HLR and IP multimedia functionality is to be established.

The main difference between the first preferred embodiment as described in conjunction with FIGS. 1 through 3 and the second preferred embodiment is that in the latter the LCS client does not directly access the subscriber database 40. In order to request for a LCS service the client contacts the location service server, e.g. a GMLC. Since only an overlay identity, such as a SIP URL, is available either a privacy check using said overlay identity may be executed by the location service server, whereby a conversion request is sent in the context of the privacy check. In response to the privacy check, more precisely to the conversion request, a cellular identity is returned. Or alternatively, the GMLC may send a separate conversion request with the overlay identity to a subscribers Privacy Profile in response to which the cellular identity then will be returned. The latter solution might also be useful in cases where a privacy check is not needed. In both cases, the privacy profile which contains the requested privacy information of a user further has to comprise a relation between the overlay identity (IMS) and the cellular (IMSI/MSISDN)

identity. Such a privacy check or separate request may either be executed accessing a privacy profile register 60 (PPR), whereby, the PPR 60 is a standalone network entity, see network architecture shown in FIG. 4. Or the PPR functionality may be integrated in H-GMLC, i.e. the H-GMLC itself contains the privacy profile. The PPR 60 is standardized in 3GPP specification 23.271. The HLR or HSS 40 contains the address to the PPR 60 or the H-GMLC may already have the PPR address e.g. from internal lookup table. The PPR 60 is accessible from the H-GMLC via the Lpp interface.

The target UE's privacy profile settings shall always be checked in the UE's home PLMN prior to delivering a location estimate. However, in FIG. 4 a situation is shown where the requesting GMLC 52 (R-GMLC), which is the GMLC receiving the request from LCS client, is not the H-GMLC 54, which is responsible to control the privacy checking of the target mobile. In order to allow location request from a GMLC outside the home PLMN while having privacy check in the home PLMN, the Lr interface is needed. The problem that arises in such a situation is that before making a privacy check the cellular identity is still unknown. On the other hand, the R-GMLC does not have the subscriber privacy profile. Hence, it cannot resolve the related cellular identity. Therefore, R-GMLC should either have a routing table containing domain addresses corresponding to a certain H-GMLC address or a query should be sent to an external database such as a DNS 90 (domain name server, not shown in FIG. 4) lookup query containing domain addresses. Since from the IMS identity it is possible to find out the domain address and since the GMLC address is a URI as e.g. specified in RFC2396 the R-GMLC will then be able to forward the request to the corresponding H-GMLC.

Figure 4:
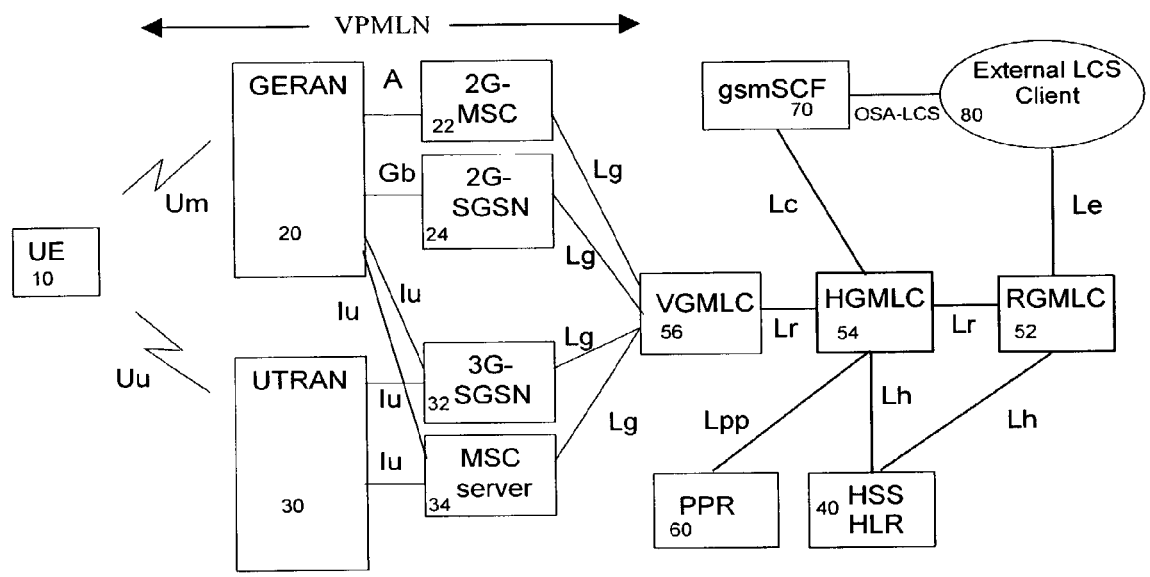
FIG. 4 shows a network architecture for implementing a location service function according to another preferred embodiment of the present invention.

Using the target subscriber identity, as before, the GMLC 50 (according to FIG. 4, the H-GMLC 54) via the Le interface accesses the HLR/HSS 40 by a MAP query via the Lh interface, e.g. a MAP-SEND-ROUTING-INFO-FOR-LCS message. As illustrated in FIG. 4, when the UE is roaming a visited GMLC 56 (V-GMLC), which is the GMLC being associated with the serving node of the target mobile, using the cellular identity initiates via the Lg interface a location service function within the cellular network identified by the routing information (address of the serving network element) obtained by the MAP query. Thereby, an IMS LCS service functionality can be provided in the UMTS/GSM network architecture. Of course the second preferred embodiment is not restricted to a situation as shown in FIG. 4. It may apply in a situation where the requesting GMLC 52 is the visited GMLC 56, which may be the home GMLC 54 in the same time. Any other constellation is possible, too.

Figure 5:
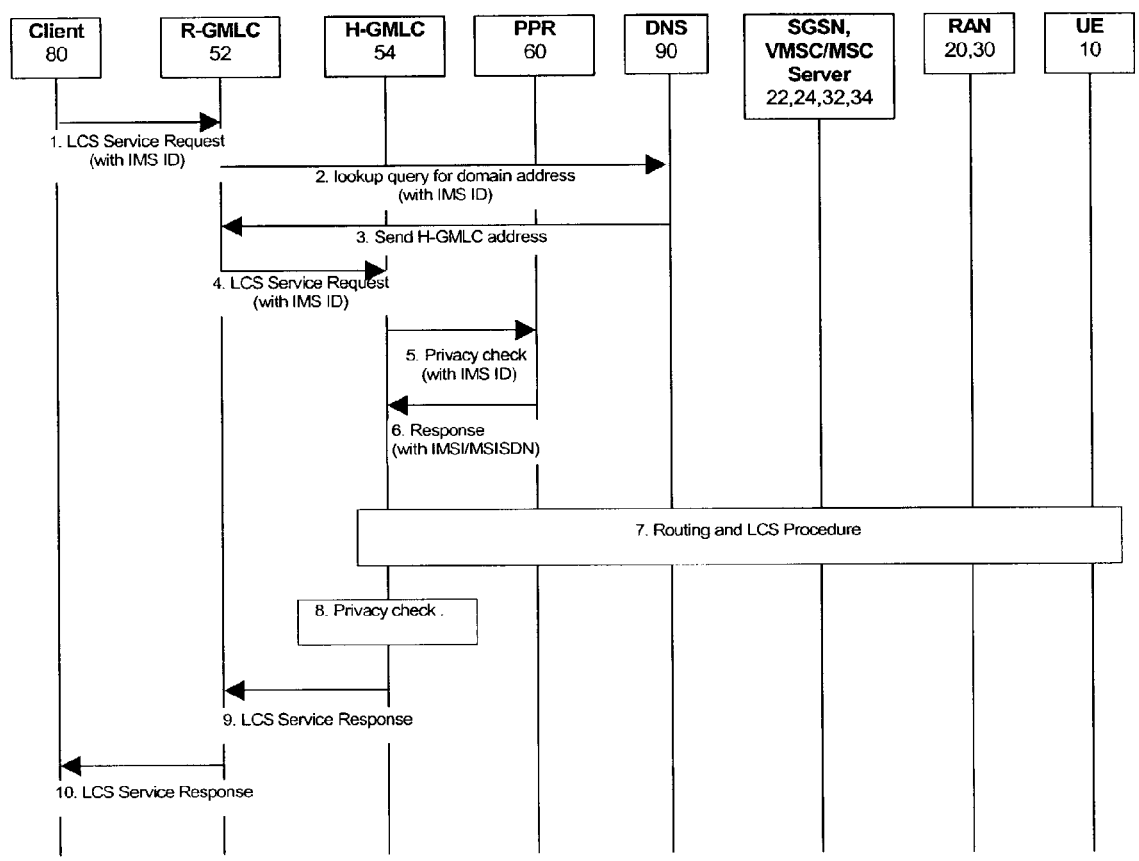
FIG. 5 shows a signaling diagram indicating exchanged signaling messages and procedures in a location service function according to the preferred embodiment shown in FIG. 4.

As illustrated in FIG. 5 the external LCS client 80 requests the current location of a target UE 10 from a GMLC, in particular from R-GMLC 52, thereby providing an overlay identity such as IMS identity only (step 1). The R-GMLC in this case performs a (standardized) DNS lookup query from DNS server 90 (step 2) in order to derive the location of the H-GMLC 54 of the target UE 10 (step 3). However, this information may as well be retrieved by a query procedure not yet standardized or by searching an internal routing table belonging to each R-GMLC 52, for example. If the R-GMLC 52 is the H-GMLC 54 of the target UE 10, i.e. the R-GMLC 52 stores the UE's privacy profile, then steps 4 and 9 are skipped. Otherwise, the R-GMLC 52 sends the location request to the H-GMLC 54 (step 4). In the next step the H-GMLC 54 verifies LCS barring restrictions in the privacy profile of the targeted user contained in the H-GMLC 54 or in PPR 60, as shown in FIG. 5. I.e., the H-GMLC 54 sends the LCS authorisation request to the PPR 60, which request carries the type of location information requested (e.g. current location), the UE subscriber's IMS (or any other overlay) identity (not being concordant with the present 3GPP standard TS 23.271). PPR performs the privacy check based on the target UE's privacy profile. The result of that privacy check and the cellular identity (IMSI/MSISDN) which, according to this preferred embodiment, is stored together with the privacy profile information is send to GMLC in the LCS Authorisation response. If the location service request is to be barred and the LCS client 80 does not have the override capability, an error response is returned to the R-GMLC 52 or the LCS client 80.

According to an alternative solution, the H-GMLC may send a separate request (not shown in FIG. 5) to PPR in order to derive the cellular identity.

As a next step 7 the normal routing (MAP-Send-routing-for-LCS-Info request, if the UE is roaming in V-GMLC) and LCS procedure takes place as described above and specified in the standards. As a result the H-GMLC receives a location service response. In case an additional privacy check was requested to be performed after the positioning procedure the LCS Authorisation Request shall also include the location estimate.

If the privacy check in step 5 indicates that further privacy checks are needed, or on the basis of the privacy profile, the H-GMLC optionally may perform an additional privacy check (step 8). The H-GMLC 54 sends the location service response to the R-GMLC 52 (step 9). Finally, the R-GMLC 52 sends the location service response to the LCS client 80 (step 10).

It is to be noted that the preferred embodiments of the present invention are not restricted to the provision of a location service in a IMS environment, but can be used for providing a location service in any overlay system having an own overlay identity allocated to the target mobile terminal. Thus, the preferred embodiment may vary within the scope of the attached claims.

The invention claimed is:
1. A method comprising:
  receiving, at a gateway mobile location center, a request to locate a mobile terminal in a cellular network from a location service client, wherein the request includes, at least in part, an overlay identity that statically identifies the mobile terminal to an overlay network without an active context established with the mobile terminal;
  causing, at least in part, a transmission of a query from the gateway mobile location center to a database, wherein the query includes, at least in part, a request for domain address information corresponding to a mobile terminal home gateway mobile location center;
  causing, at least in part, a reception of the requested domain address information at the gateway mobile location center from the database;
  causing, at least in part, from the gateway mobile location center a transmission of a conversion request to the mobile terminal home gateway location center for a determination of a cellular identity of the mobile terminal via a Privacy Profile Register based, at least in part, on the overlay identity;
  initiating an access of a subscriber database using the cellular identity to determine routing information for the mobile terminal; and
  initiating a location service of the cellular network based on the cellular identity and the routing information to provide a geographical location of the mobile terminal.

2. A method of claim 1, wherein the transmission of the of the conversion request is based, at least in part, on the domain address information.

3. A method of claim 1, wherein the transmission of the conversion request is in a context of a privacy check, and wherein the cellular identity is returned in response to the privacy check.

4. A method of claim 1, wherein the location service client is an internet protocol multimedia system (IMS) server and the overlay identity is an IMS identity.

5. A method of claim 4, wherein the IMS server is a session initiation protocol (SIP) application server and the IMS identity is a SIP uniform resource locator (URL).

6. A method of claim 1, wherein the location service is performed by using a MAP-SEND-ROUTING-INFOFOR-LCS service function.

7. A method of claim 1, wherein the cellular identity is a mobile station integrated services data network (MSISDN) identity or an international mobile subscriber identity (IMSI).

8. A method of claim 1, wherein the routing information is an address of a network element, having a switching function in the cellular network.

9. An apparatus comprising:
at least one processor; and
at least one memory including computer program code for one or more programs,
the at least one memory and the computer program code configured to, with the at least one processor, cause the apparatus to perform at least the following,
receive, at a gateway mobile location center, a request to locate a mobile terminal in a cellular network from a location service client, wherein the request includes, at least in part, an overlay identity that statically identifies the mobile terminal to an overlay network without an active context established with the mobile terminal;
cause, at least in part, a transmission of a query from the gateway mobile location center to a database, wherein the query includes, at least in part, a request for domain address information corresponding to a mobile terminal home gateway mobile location center;
cause, at least in part, a reception of the requested domain address information at the gateway mobile location center from the database;
cause, at least in part, from the gateway mobile location center a transmission of a conversion request to the mobile terminal home gateway location center for a determination of a cellular identity of the mobile terminal via a Privacy Profile Register based, at least in part, on the overlay identity;
initiate an access of a subscriber database using the cellular identity to determine routing information for the mobile terminal; and
initiate a location service of the cellular network based on the cellular identity and the routing information to provide a geographical location of the mobile terminal.

10. An apparatus of claim 9, wherein the transmission of the of the conversion request is based, at least in part, on the domain address information.

11. An apparatus of claim 9, wherein the transmission of the conversion request is in a context of a privacy check, and wherein the cellular identity is returned in response to the privacy check.

12. An apparatus of claim 9, wherein the location service client is an internet protocol multimedia system (IMS) server and the overlay identity is an IMS identity.

13. An apparatus of claim 12, wherein the IMS server is a session initiation protocol (SIP) application server and the IMS identity is a SIP uniform resource locator (URL).

14. An apparatus of claim 9, wherein the location service is performed by using a MAP-SEND-ROUTING-INFOFOR-LCS service function.

15. An apparatus of claim 9, wherein the cellular identity is a mobile station integrated services data network (MSISDN) identity or an international mobile subscriber identity (IMSI).

16. An apparatus of claim 9, wherein the routing information is an address of a network element, having a switching function in the cellular network.

* * * * *